United States Patent [19]

Dollar

[11] Patent Number: 5,634,796
[45] Date of Patent: Jun. 3, 1997

[54] METHOD FOR VISUAL STIMULATION OF INFANTS

[76] Inventor: Robert T. Dollar, 630 Druid Hills Rd., Temple Terrace, Fla. 33617

[21] Appl. No.: 424,709

[22] Filed: Apr. 17, 1995

[51] Int. Cl.⁶ .................................... G09B 19/00
[52] U.S. Cl. ........................... 434/236; 446/227
[58] Field of Search ............... 434/236, 81, 112, 434/428; 5/93.1, 100, 507.1, 907; 446/227

[56] References Cited

U.S. PATENT DOCUMENTS

| | | | |
|---|---|---|---|
| 2,461,682 | 2/1949 | Ferrari | 446/227 X |
| 3,344,442 | 10/1967 | Andrews et al. | 5/100 X |
| 3,400,829 | 9/1968 | Youngson | 5/507.1 X |
| 4,017,920 | 4/1977 | Sieg | 5/507.1 |
| 5,073,825 | 12/1991 | Holdredge et al. | 5/100 X |

FOREIGN PATENT DOCUMENTS 1460533  12/1966  France ........................... 5/507.1

*Primary Examiner*—Jeffrey A. Smith
*Attorney, Agent, or Firm*—Dominik & Stein

[57] ABSTRACT

A system for advancing the neurological development of an infant in a crib, the crib including side members particularly above the infant, the system comprising attachment to the top of said side members and above the head of the infant, a panel of transparent rigid material and placing, on top of said panel of rigid material, an article including indicia for the visual stimulation of the infant.

6 Claims, 4 Drawing Sheets

METHOD FOR VISUAL STIMULATION OF INFANTS

BACKGROUND OF THE INVENTION

1. Field of the Invention

The present invention is concerned with the delivery of visual stimulation to an infant for neurological development. Visual stimuli are presented by means of a simple device designed to position pictorial or other two-dimensional information at the optimal spatio-temporal orientation for maximal neurological enhancement.

2. Description of the Related Art

It is well documented that infants have the ability to react to visual stimuli. For example, when presented with a picture of a human face, an infant will react by smiling. For this reason, various devices have been developed for enriching the visual environment of the infant. Devices such as mobiles can be seen in, e.g., U.S. Pat. No. 4,573,654 (Nottingham); U.S. Pat. No. 4,335,583 (Greenmberg) and U.S. Pat. No. 4,984,380 (Anderson). However, when these devices are positioned over the head of an infant in a crib, the infant sees only the underside of the objects. Although the mobile may appear attractive to the adults visiting the nursery, the infant will find little stimulation from the display of the undersides of fish, mice, airplanes, etc.

It is also well known that the infant will spend many hours every day laying on his back in a crib, and thus requires some form of visual stimulation, preferably educational in nature. However, hitherto no system or device has been developed capable of providing an enriched learning environment specifically tailored to the neurological state of visual development of an infant. That is, for optimal learning, the information must be presented (1) in the visual field of an infant lying on his back, i.e., over the head of the infant, (2) in a form in which the information is capable of perception and recognition, and (3) for a suitable period of time.

A search of patent literature has revealed several patents which concern or mention the presentation of visual stimuli in a position which may enhance development. However, each has significant deficiencies.

U. S. Pat. No. 2,883,678 (Heffernan et al) teaches a cloth crib cover which crib cover may include illustrative designs which will attract the attention and provide entertainment for the child. Permanent ornamental or decorative designs are provided on the underside of the cover to attract the attention of the child and occupy the mind and provide interesting entertainment. However, the deigns are permanent and can not be changed hourly or daily for maximal educational effect. Further, the canopy is not transparent and thus restricts the visual field of the infant.

U.S. Pat. No. 3,344,442 (Andrews et al) teaches a deformed plastic "bubble" which is preferably a rigid plastic dome for covering the entire top of a rectangular child's crib. The device is intended for keeping the infant in the crib, for keeping unauthorized hospital patients, animals, insects, etc. out of the crib. There is mention that the plastic bubble may have decorative effects incorporated therein, which effects may be pleasing to the eye of a child, or that decorative effects in the nature of decals can be subsequently applied to the surface of the deformed plastic bubble. Further, a crayon or a marker may be used to make manuscript inscriptions for entertaining the child or hospital informative purposes. However, there is no mention that the deformed plastic dome may be modified so as to permit the ready presentation and variation of educational two-dimensional images. Further, the deformed plastic dome is intended for enclosing the top of a crib and is thus large and bulky and will not be used for the presentation of visual stimuli to infants according to the present invention.

U.S. Pat. Nos. 4,939,582, 5,073,825 and 5,206,733 are related patents (Holdredge et al) and teach a convertible audio-visual display center adapted to reproduce visual images on a video display unit, such as television receiver, for the entertainment and/or education of infants and their cribs. The device is very complex and expensive, and further has disadvantages such as risk of shock, risk of damage, electricity cost, risk of the television or computer monitor following on the infant, continuous irradiation of the infant with low level radiation, etc. Further, the visual display is intended to be dynamic, which detracts from the ability of the infant to inspect, become familiarized with, and remember a specific static image such as a letter, number, or picture of a family member.

Given the high state of interest of a parent in the development of an infant, it would be expected that a parent or a friend or relative of the parent would want to provide the infant with every developmental advantage. As such, a device designed for optimal presentation of visual stimuli to an infant would be a requisite to every nursery. However, such a device does not yet exist.

It is thus an object of the present invention to provide a vehicle for enhancing the visual and neurological development of an infant.

It is a further object of the present invention to provide a system and device for neurological development which eliminates or minimizes the above-mentioned and other problems, limitations and disadvantages typically associated with conventional nursery visual displays, and to provide an system and device which is light weight, simple to manufacture, easy to install and use, inexpensive, reliable, compact and which does not detract from the aesthetic appearance of the nursery.

SUMMARY OF THE INVENTION

The system and device according to the invention is based upon studies in infant perception, and is based upon the discovery that optimal presentation occurs within a specific distance and time period, and that existing devices are not based upon this understanding and do not optimize the presentation of visual stimuli. Although the device employed in the present invention would appear to be simple in construction, the invention for the first time addresses the problem of neurological and cognitive development of infants while in the crib.

The invention is accomplished by the provision of a transparent surface over the head of an infant residing in a crib for displaying these generally two dimensional images to the infant.

In one specific embodiment, the invention is in the form of a sheet of transparent PLEXIGLAS, a methyl acrylate plastic about 18 inches by 36 inches with runners or anchoring means on the narrow ends, so that the PLEXIGLAS, a methyl acrylate plastic can be laid across the top of the railings or walls of a crib, above the head of the infant, with relative confidence that the device will not be dislodged and fall on the infant.

Though relatively simple in construction, the device is first to serve a purpose which had not hitherto been addressed.

Thus, the invention for the first time provides a relatively simple, easy to manufacture device which allows for presenting visual stimulation to an infant. The device is in no way intended for keeping the infant in the crib or for keeping intruders out of the crib.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other devices for visual stimulation of infants for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made by the following detailed description taken in with the accompanying drawings in which.

DETAILED DESCRIPTION OF THE INVENTION

Figure 1:
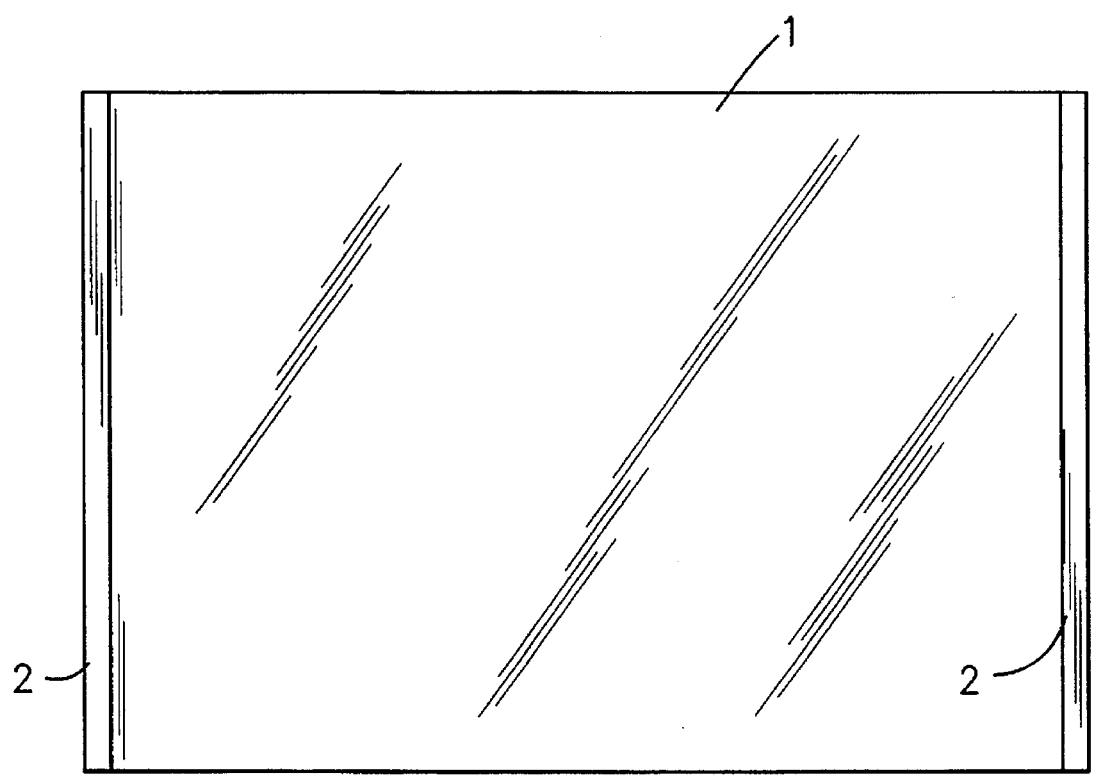
FIG. 1 is a bottom diagonal view of the display device.

Infants react to visual stimuli. If infants are presented with a projection of a symmetrically expanding silhouette, they react as if the object were heading for them on a collision course, turn their head away, and raise their hands protectively. Infants "freeze" when presented with a simulated edge of a visual cliff.

Interestingly, infants conditioned to activate an electrical switch in their cushions with movements in their head were able to learn to respond when the training stimuli was a cube measuring 30 cm at the sides presented at a distance of one meter. The same infants did not respond to a 90 cm cube at three meters distance, though the image was the same size on the retina as that of a 30 cm cube. Thus, not only size but also distance is important in the visual training of the infants.

Briefly stated, the present invention provides for the modification of a crib in order to permit the display of educational materials, photographs of family members, etc. to the infant lying in the crib. The device according to the present invention takes the form of a sheet of flat transparent glass, preferably non-breakable glass, or plastic, preferably a plexiglass material. In the case of the sheet is made of a plexiglass material, the ends which fit over the top railings of a crib are preferably be formed to bend over the rail and attached to the rail. Alternatively, wooden slats or runners may be attached to the bottom sides of the plexiglass sheet in order securely fit to the edge of a crib.

The PLEXIGLAS, a methyl acrylate plastic, may have holes predrilled along the ends in order to permit assembly of the device to snuggly fit on the crib railings. That is, the sheet of PLEXIGLAS, a methyl acrylate plastic, is preferably rectangular, preferably 12 to 24 inches in width, most preferably, about 18 inches in width, and 24 to 42 inches in length. When provided in a ready-to-assemble form, the PLEXIGLAS, a methyl acrylate plastic, may have holes predrilled along the top and bottom beginning on the left and right ends and approximately spaced-apart. In this way, a PLEXIGLAS, methyl acrylate plastic, sheet which is 36 inches in length and has holes predrilled along the top and bottom and one/half inch apart can be customized to fit onto a crib having a 32-inch outer diameter as follows. The slats may be, for example, one inch in width. In order to fit snuggly onto a 32-inch crib, the slats are simply attached by screwing through holes spaced 33 inches apart. The inner diameter between the slats will, as a result, be 32 inches.

In the case that the infant is capable of reaching the display device, it is preferred that the display device be anchored so as to prevent dislodging and falling onto the infant. The means for anchoring may be, for example, VELCRO hook-and pile fasteners, metal hooks, snap-fitting means, etc.

In an alternative embodiment of the invention, the device may be provided with VELCRO hook-and pile fasteners such that the hook part of the fasteners may be glued onto either the plexiglass display device or onto the top of the crib rail, and the other of the hook or pile strips may be attached to the other of the plexiglass or crib rail.

In a yet further embodiment of the invention, the device may be provided in the form of a first and second runner for releasably attaching to a crib rail, the top of the runners be provided with releasable attachment means such as VEKCRO hook-and pile fastener or snap fasteners, and the bottom of the plexiglass be provided with mating elements for attachment to the top of the runners.

In a yet further embodiment of the invention, the PLEXIGLAS, methyl acrylate plastic, may be provided with curve portions on at least one end for encompassing one rail at least in part so as to enable the more ready and stable attachment of the display device onto the crib.

In a yet further embodiment of the invention, the device may be provided with predrilled holes along the top and bottom thereof corresponding to approximate positions of the crib rails, and may be provided with strings such as shoestrings or pipe cleaners or the like by means of which the display device can be tied onto the crib rails through the holes in the display device. In this arrangement, it is only necessary that the display device be tied onto the crib rails on either one or the other side thereof such that, even when kicked or pushed by the infant, the device is incapable of sliding off of the rail and falling onto the infant.

The device should be strong enough for bearing educational materials for the visual stimulation of the infant. For example, large alphabetic or numerical indicia may be present to the infant.

It is known that an infant is not capable of rapid learning and of rapid response to the environment. However, it is reasonable to believe that the prolonged exposure of the infant to educational visual stimuli may have an effect on the infant. It is expected that alphabetic or numeric characters presented to an infant one at a time for long periods of time, should familiarize the infant with the characters and form a stable prolonged impression on the infant which should facilitate his educational experience in future years. In fact, visual stimulation should effect the individual for the rest of his life.

Given that the display device is intended for displaying two-dimensional figures or images, it is not necessary that the display device be of a character sufficient for displaying heavy objects. However, given the frequency of removal and replacement of the display device and the desire to ensure for the safety of the infant, it is preferred that the display device be of a sufficient strength and character so as not to break during even careless use.

The device may have borders or edges for attachment of other items such as nursing bottles, lights, acoustical speakers, etc.

The device is not limited to use with infants and may be used for hospital patients, persons otherwise restrained in a horizontal position, for relaxing, etc.

The invention will now be described in greater detail with reference to the drawings.

FIG. 1 shows the display device from underneath. The main elements are the sheet of transparent material 1 and the longitudinal members 2 provided for strength and for mating the display device to the top of a crib, in the manner that a plastic lid is mated to the top of a resealable cake frosting can.

Figure 2:
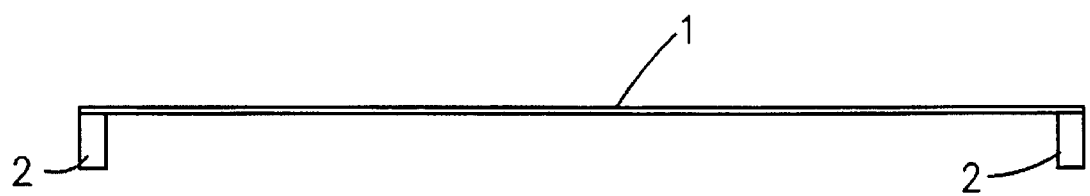
FIG. 2 is a side view of the device along the longitudinal axis.

FIG. 2 shows the same display device as FIG. 1, but from a sideways perspective along the longitudinal plane.

Figure 3:
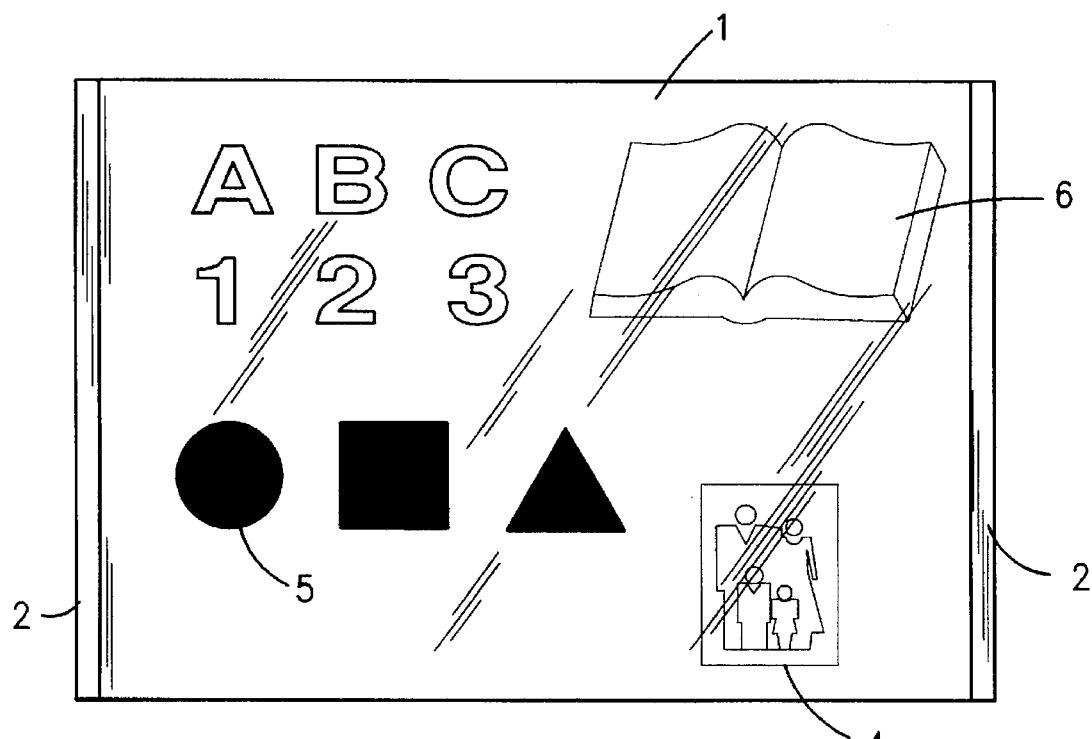
FIG. 3 is a bottom view of the device according to FIG. 1, but with educational materials being displayed to the infant.

FIG. 3 shows the display device with information materials such as numbers and letters 3, a family picture 4, shapes 5 and a book 6 in the presentation as seen by the infant. The infant will be able to familiarize himself with the images while looking at them for hours. The images will form a lasting impression on the infant and will facilitate learning later in school.

Figure 4:
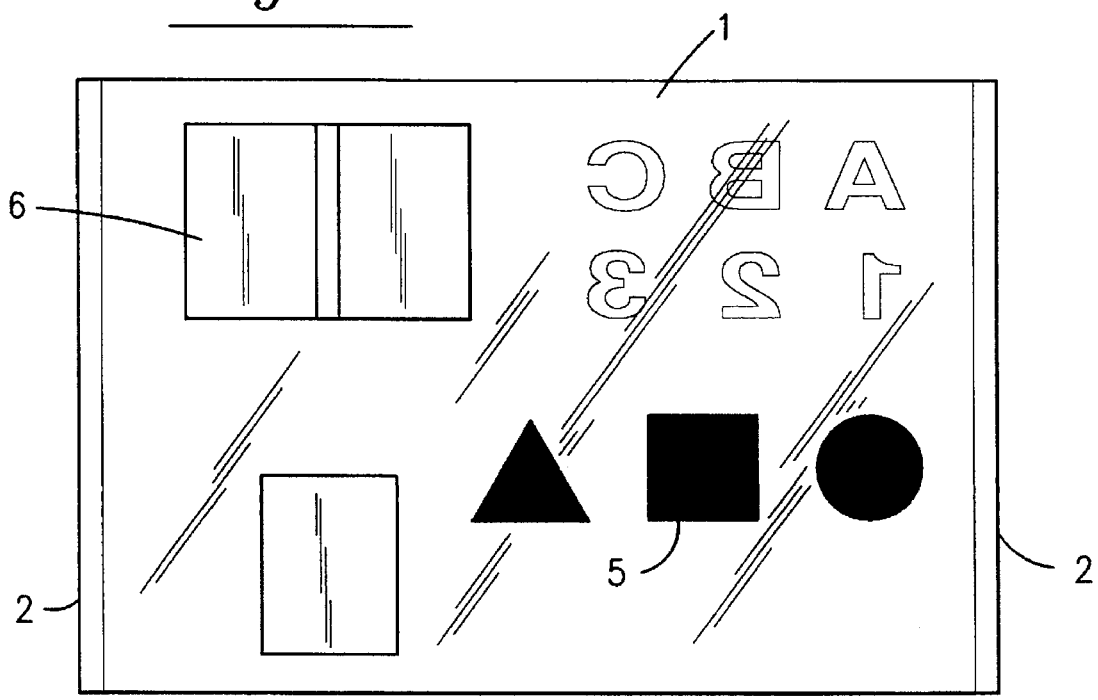
FIG. 4 is the same device and displaying the same materials as in FIG. 3, but from a top view.

FIG. 4. shows the same display device and information materials as FIG. 3, but from the top view as would be seen by an adult. Obviously, the images would appear reversed to an adult.

Figure 5:
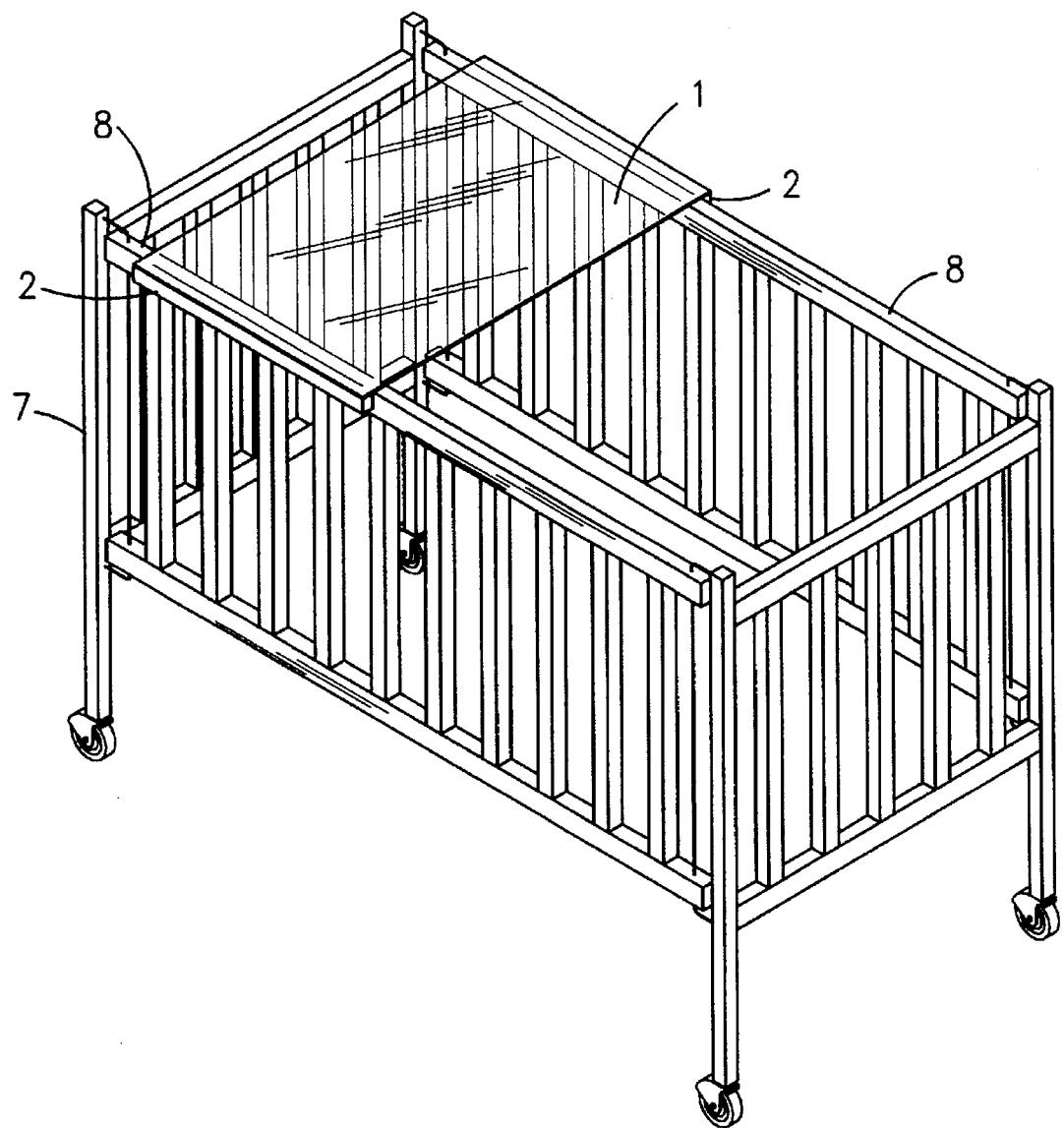
FIG. 5 shows a crib for an infant with the display device mounted over the head of the infant.

FIG. 5 shows the device as shown in FIG. 1 installed on a crib 7 with longitudinal members 2 running adjacent to the top side railings 8 of crib 7. The members 2 preferably frictionally engage the rails 8, but may be tied on with string, may be attached with VELCRO hook-and pile fastener, may be attached with snap-fasteners, etc.

Figure 6:
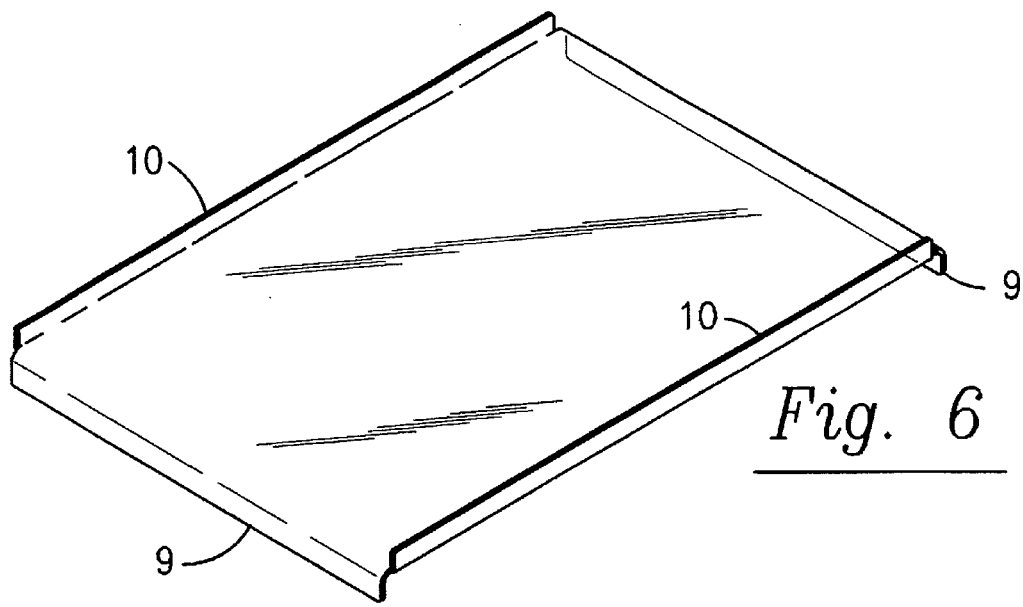
FIG. 6 shows a PLEXIGLAS, a methyl acrylate plastic, display device with edges deformed for strength.

FIG. 6 shows an alternative embodiment of the invention, wherein a sheet of deformable plastic has the left and right sides bent downwards 9 and the longitudinal edges bent upwards 10. In this way a sheet of inexpensive plexiglass can be strengthened for supporting books, etc. Further, the shape prevents the display device from falling down upon the infant.

Figure 7:
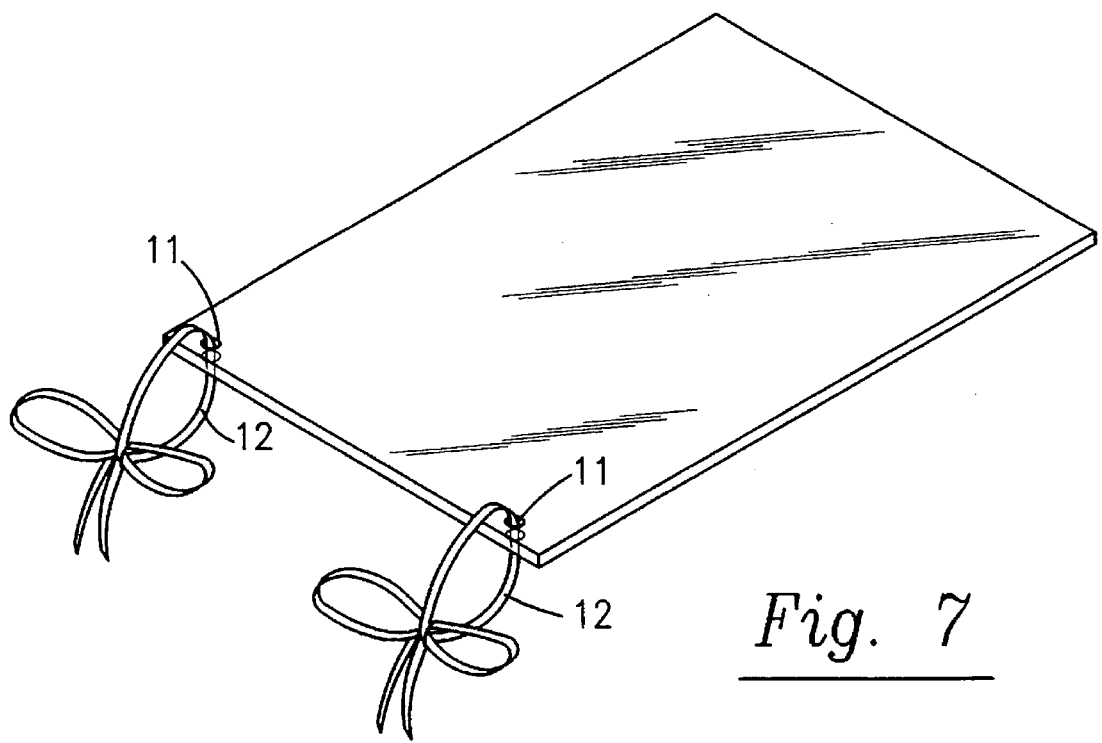
FIG. 7 shows a simple PLEXIGLAS, a methyl acrylate plastic, sheet with means for tying to the crib railing.

FIG. 7 is perhaps the simplest embodiment of the invention. The display device is a simple sheet of PLEXIGLAS, methyl acrylate plastic, or safety glass with bore holes 11 on at least one end for permitting securing means such as VELCRO hook-and pile fastener, shoe strings 12, wires, etc. to pass through for securing the display device to the crib railing. In this way, one end of the display device is attached and can not fall into the crib, and the other end extends beyond the crib railing and thus also can not fall into the crib.

Although the device for visual stimulation of infants was first designed for use in combination with infant cribs, it will be readily apparent that the invention is capable of use in a number of other applications, such as for invalids, hospital patients, university students, etc. Although this invention has been described in its preferred form with a certain degree of particularity with respect to a simplified design such as a sheet of glass or plexiglass, it is understood that the present disclosure of the preferred form has been made only by way of example and that numerous changes in the details of structures and the composition of the combination may be resorted to without departing from the spirit and scope of the invention.

Now that the invention has been described, what is claimed is:

1. A method for delivering visual stimulation to an infant in a crib, the crib having a longitudinal axis and including side members, said side members each having a length which extends parallel to said longitudinal axis and above the head of the infant, the method comprising the steps of: placing on the top of said side members and above the head of the infant a substantially flat panel of transparent rigid material, said step of placing including selectively positioning said panel at a position along the length of said side members such that said panel is presented in the visual field of said infant; and placing, on top of said panel of rigid material, static indicia for the visual stimulation of the infant wherein said panel, measured along the longitudinal axis of said crib, has a width substantially less than the length of the respective side members, thereby permitting said panel to be movably positioned at different locations along the length of said side members.

2. A method as in claim 1, wherein said panel of transparent material has a top and a bottom side, and said panel of transparent material further comprises elongated strengthening members attached on said bottom of said panel, said elongated strengthening members oriented parallel to and outside of said side members.

3. A method as in claim 1, further including means for releasably attaching said panel of material.

4. A method as in claim 1, wherein said panel of material is a non-breakable glass.

5. A method as in claim 1, wherein said panel of material is a transparent plastic material.

6. A method as in claim 5, wherein at least one edge of said rigid panel of plastic material is deformed so as to bend downward so as to fit more securely over said side member.

* * * * *